United States Patent
Narita et al.

(10) Patent No.: US 6,632,144 B1
(45) Date of Patent: Oct. 14, 2003

(54) OUTPUT SHAFT STRUCTURE FOR SHAFT DRIVE VEHICLE

(75) Inventors: Satoru Narita, Saitama (JP); Kenji Okubo, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 1 day.

(21) Appl. No.: 09/654,258

(22) Filed: Sep. 1, 2000

(30) Foreign Application Priority Data

Sep. 3, 1999 (JP) .......................................... 11-250060

(51) Int. Cl.$^7$ .............................................. B60K 23/08
(52) U.S. Cl. ....................................... 464/179; 180/233
(58) Field of Search ................................ 180/247, 233; 464/179, 182

(56) References Cited

U.S. PATENT DOCUMENTS

| | | | | |
|---|---|---|---|---|
| 4,372,415 A | * | 2/1983 | Watanabe et al. ........... | 180/215 |
| 4,560,025 A | * | 12/1985 | Suzuki et al. ............... | 180/247 |
| 4,650,029 A | * | 3/1987 | Foote et al. ................ | 180/233 |
| 4,693,333 A | * | 9/1987 | Oka ........................... | 180/233 |
| 4,719,819 A | * | 1/1988 | Tsutsumikoshi et al. .... | 180/233 |
| 5,012,887 A | * | 5/1991 | Butz et al. .................. | 180/305 |
| 5,284,285 A | * | 2/1994 | Ferguson .................... | 384/560 |
| 5,515,940 A | * | 5/1996 | Shichinohe et al. ........ | 180/233 |
| 5,599,249 A | * | 2/1997 | Zalewski et al. ............ | 180/24 |
| 6,170,597 B1 | * | 1/2001 | Fukuda ....................... | 180/292 |

FOREIGN PATENT DOCUMENTS

JP A825979 1/1996

* cited by examiner

*Primary Examiner*—David Bochna
*Assistant Examiner*—Kenneth Thompson
(74) *Attorney, Agent, or Firm*—Birch, Stewart, Kolasch & Birch, LLP

(57) ABSTRACT

To easily perform a change between a four-wheel drive operation of a vehicle to a two-wheel drive operation of the vehicle. In a four-wheel buggy having the four-wheel drive specification in which a longitudinally mounted engine with a crank shaft is directed in the longitudinal direction of the vehicular body, an output shaft is divided into a main body portion and a front wheel connection portion. In the case of applying the output shaft structure to the four-wheel drive specification, a male spline formed on a front end portion of the main body portion is fitted in a female spline formed in a rear end portion of the front wheel connection portion. A front end portion of the front wheel connection portion projects forwardly from an outlet portion of a front case cover, and is connected to a front wheel propeller shaft. On the other hand, in the case of applying the output shaft structure to the two-wheel drive specification, the output shaft composed of only the main body portion to which the front wheel connection portion is not connected, can be commonly used, and the outlet portion of the front case cover may be left as cast, that is, without formation of the through-hole. Accordingly, it is possible to easily perform a change between the four-wheel drive specification and the two-wheel drive specification by commonly using the power unit case, except that only the front case cover requires a slight modification for the four-wheel drive specification.

13 Claims, 4 Drawing Sheets

OUTPUT SHAFT STRUCTURE FOR SHAFT DRIVE VEHICLE

BACKGROUND OF THE INVENTION

1. Field to Which the Invention

The present invention relates to an output shaft structure for a shaft drive vehicle such as a four-wheel drive vehicle, and particularly to an output shaft structure capable of easily performing a change between power supplied to both the front and rear wheel drives and power supplied to the rear wheel drive.

2. Description of Background Art

Japanese Patent Laid-open No. Hei 8-25979 discloses a four-wheel buggy on which an engine with its crank shaft directed in the longitudinal direction of the vehicle is mounted (the engine of this type is hereinafter referred to as a "longitudinally mounted engine"), wherein four front and rear wheels are shaftdriven. The four-wheel buggy has a power transmission structure in which an output shaft is provided in such a manner as to pass through a lower portion of a power unit case in the longitudinal direction, and the front end, projecting forwardly from the power unit, of the output shaft is connected to a front wheel side propeller shaft to drive the front wheel and the rear end, projecting rearwardly from the power unit, of output shaft is connected to a rear wheel side propeller shaft to drive the rear wheel.

The above structure, however, has the following inconvenience: namely, since the output shaft passes through the power unit case, the output shaft and the power unit case for the four-wheel buggy having the front and rear wheel drive specification cannot be commonly used for a vehicle having a rear wheel drive specification. In other words, output shafts and power unit cases specialized for the rear wheel drive specification and the front and rear wheel drive specification must be individually manufactured. In view of the foregoing, a primary object of the present invention is to realize the common use of an output shaft between vehicles having a front and rear drive specification and a rear wheel drive specification.

Since the conventional output shaft is formed of a single shaft member extending over the entire length, it must be often supported by bearing portions disposed at three or more points. If the output shaft is supported by three bearings, the assemble of the output shaft with the three bearings becomes impossible unless the journal diameter of each of the bearing portions at both the ends is smaller than the inside diameter of the central bearing. Accordingly, the size of the bearings at both the ends exert an effect on the size of the central bearing. On the contrary, if the size of the bearings at both the ends are set at required values, the inside diameter of the central bearing must be set at a larger value. This results in a dimensional limitation in which distances between the output shaft and the adjacent shaft and its peripheral parts must be made larger.

As a result, according to the conventional single longer output shaft, it may be difficult to achieve the requirement to make the power unit compact. The longer single output shaft has another problem that since the longer output shaft requires a plurality of bearing portions whose dimensions must be accurately kept for preventing the runout thereof, the formation of the bearing portions must be accurately controlled at the manufacturing steps. The longer the output shaft becomes, the more the keeping of accuracy becomes difficult. Also, to obtain such high accuracy bearing portions, the manufacture of the output shaft requires a large number of steps, such as preparation of the base material, rough-machining of the bearing portions, heat-treatment, bend flattening, polishing of the bearing portions, and re-straightening. In view of the foregoing, a secondary object of the present invention is to solve the above-described problems.

SUMMARY AND OBJECTS OF THE INVENTION

To achieve the above objects, according to the present invention, there is provided an output shaft structure for a shaft drive vehicle including an output shaft for transmitting the output of an engine to both the front wheel side and the rear wheel side, characterized in that the output shaft is connectably divided into a front wheel side shaft portion and a rear wheel side shaft portion.

According to the present invention, the front wheel side shaft portion is spline-connected to the rear wheel side shaft portion.

According to the present invention, the output shaft is divided into the front wheel side shaft portion and the rear wheel side shaft portion, and accordingly, in the case of applying the output shaft structure to the front and rear wheel drive specification, the front wheels and the rear wheels can be simultaneously driven by using the output shaft composed of the front wheel side shaft portion and the rear wheel side shaft portion connected to each other, and in the case of applying the output shaft structure to the rear wheel drive specification, only the rear wheels can be driven by using the output shaft composed of only the rear wheel side shaft portion to which the front wheel side shaft portion is not connected. In this way, according to the present invention, the rear wheel side shaft portion can be commonly used for the rear wheel drive specification and the front and rear wheel drive specification, and the power unit case can be also commonly used for both the specifications except that the power unit case is slightly machined for the front and rear wheel drive specification. As a result, it is possible to easily perform the change between the front and rear wheel drive specification and the rear wheel drive specification.

According to the present invention, since the front wheel side shaft portion is spline-connected to the rear wheel side shaft portion, both the shafts can be easily connected to and separated from each other. Also, since the outer periphery of a portion, located rearwardly from the male spline (that is, the connection portion to the front wheel side shaft portion), of the rear wheel side shaft portion is rotatably supported, the journal diameter of the bearing portion can be made small. As a result, it is possible to shorten a distance between the output shaft and the transmission side, and hence to make the entire power unit compact. Further, since the output shaft is divided into parts, it is possible to easily manufacture the output shaft because the degree of control of accuracy of each of the parts at the manufacturing steps can be made moderate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, one embodiment in which the present invention is applied to a four-wheel buggy used as an all-terrain vehicle will be described with reference to the drawings.

Figure 2:
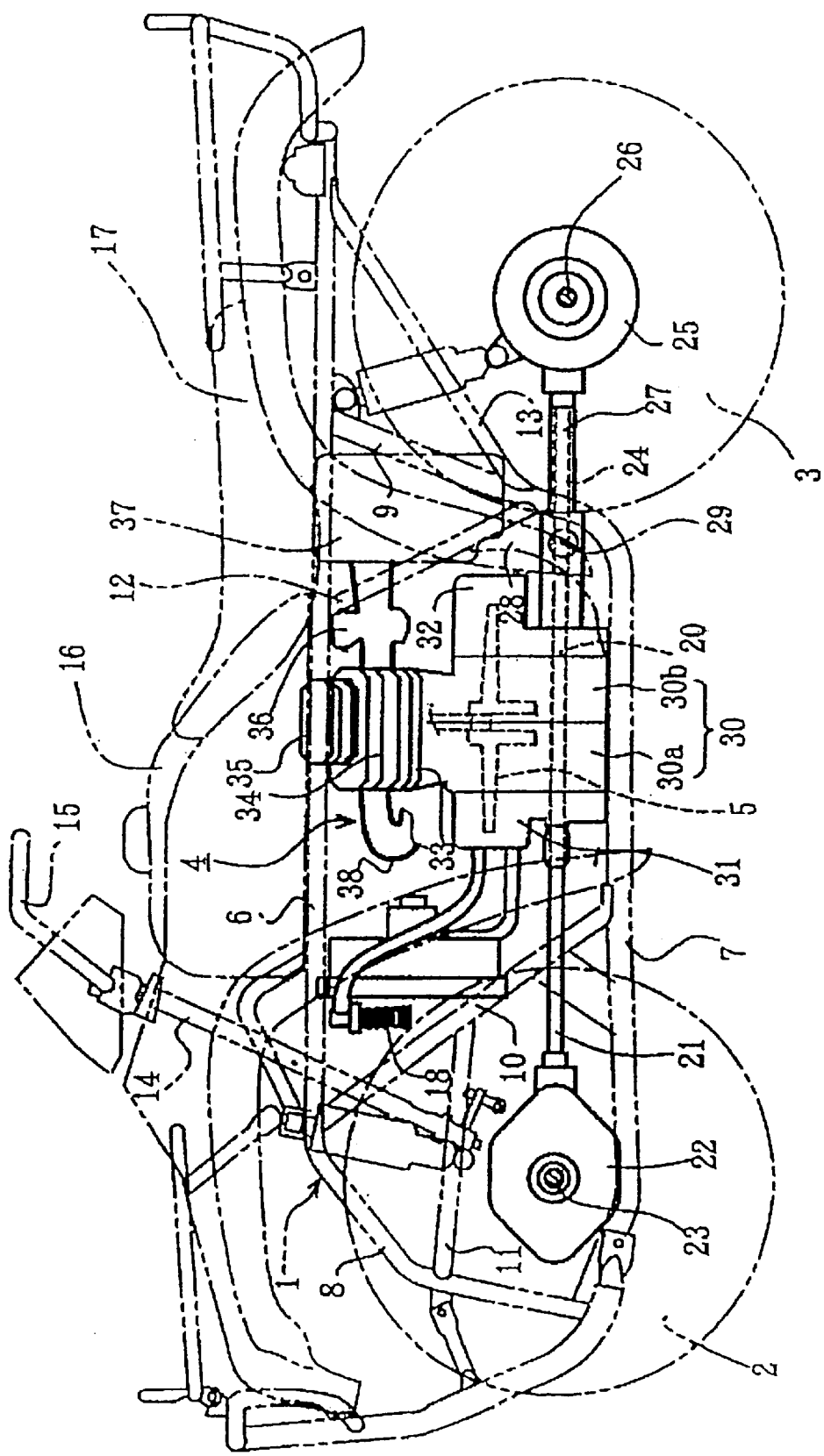
FIG. 2 is a side view showing an essential portion of a four-wheel buggy to which the embodiment is applied.

Referring to FIG. 2, the four-wheel buggy includes a pair of right and left front wheels 2 and a pair of right and left rear wheels 3 provided on the front and rear portions of a body frame 1, respectively. A power unit 4 including an engine and a transmission is supported by a central portion of the body frame 1. The power unit 4 is of a longitudinally mounted type in which a crank shaft 5 is directed in the longitudinal direction of the vehicular body.

The body frame 1 includes an upper pipe 6 and a lower pipe 7, which are connected to each other by a front pipe 8, a rear pipe 9, and a reinforcing pipe 10, and further reinforced by several kinds of reinforcing pipes 11, 12, 13, and the like. In FIG. 2, a handle shaft 14 is connected to a handlebar 15. A fuel tank 16 is provided adjacent to a saddle type seat 17. An oil cooler 18 is operatively mounted forward of the engine.

In the four-wheel buggy, which is of a four-wheel drive type, the front end of an output shaft 20 provided on a lower portion of the power unit 4 in parallel to the crank shaft 5 is connected to the rear end of a front wheel propeller shaft 21 for driving a front wheel axle 23 via a front wheel gear case 22.

The rear end of the output shaft 20 is connected to the front end of a rear wheel propeller shaft 24 for driving a rear wheel axle 26 via a rear wheel gear case 25. The rear wheel propeller shaft 24 is housed in a rear swing arm 27. The rear end of the rear swing arm 27 is connected to the rear wheel gear case 25, and the front end of the rear swing arm 27 is swingably supported via a pivot 29 by a pivot plate 28 operatively connected to the rear pipe 9.

Figure 3:
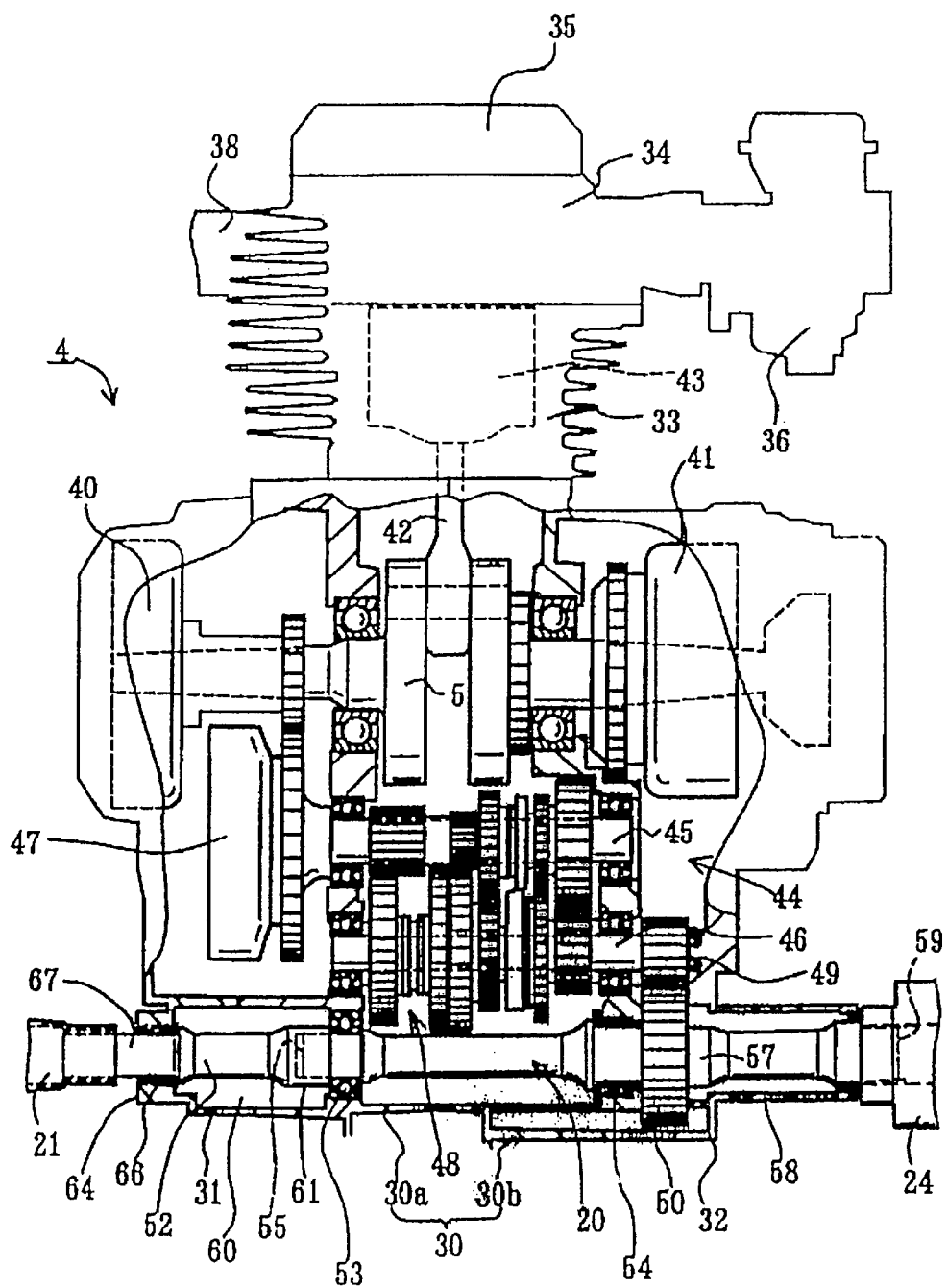
FIG. 3 is a vertical sectional view showing a power unit.

FIG. 3 schematically shows the vertical cross-section of a transmission mechanism portion of the power unit 4 cut along a plane passing through constituent shafts of the transmission mechanism portion. The front side of a crank case 30 of the power unit 4 is covered with a front case cover 31, and the rear side of the crank case 30 is covered with a rear case cover 32. These cases constitute a power unit case. A cylinder block 33, a cylinder head 34, and a cylinder head cover 35 are mounted on the upper portion of the crank case 30. A carburetor 36 is connected to an intake port of the cylinder head 34, and an air cleaner 37, as illustrated in FIG. 2, is connected to the carburetor 36. An exhaust pipe 38 is connected to an exhaust port of the cylinder head 34.

The crank case 30 is divided in the longitudinal direction into a front case 30a and a rear case 30b. The crank shaft 5 is supported between the front case 30a and the rear case 30b. In FIG. 3, a start clutch 40 is configured as a known centrifugal clutch mechanism provided at one end of the crank shaft 5 with an ACG 41 is provided on the other end side. A connecting rod 42 is operatively connected to a piston 43.

Figure 1:
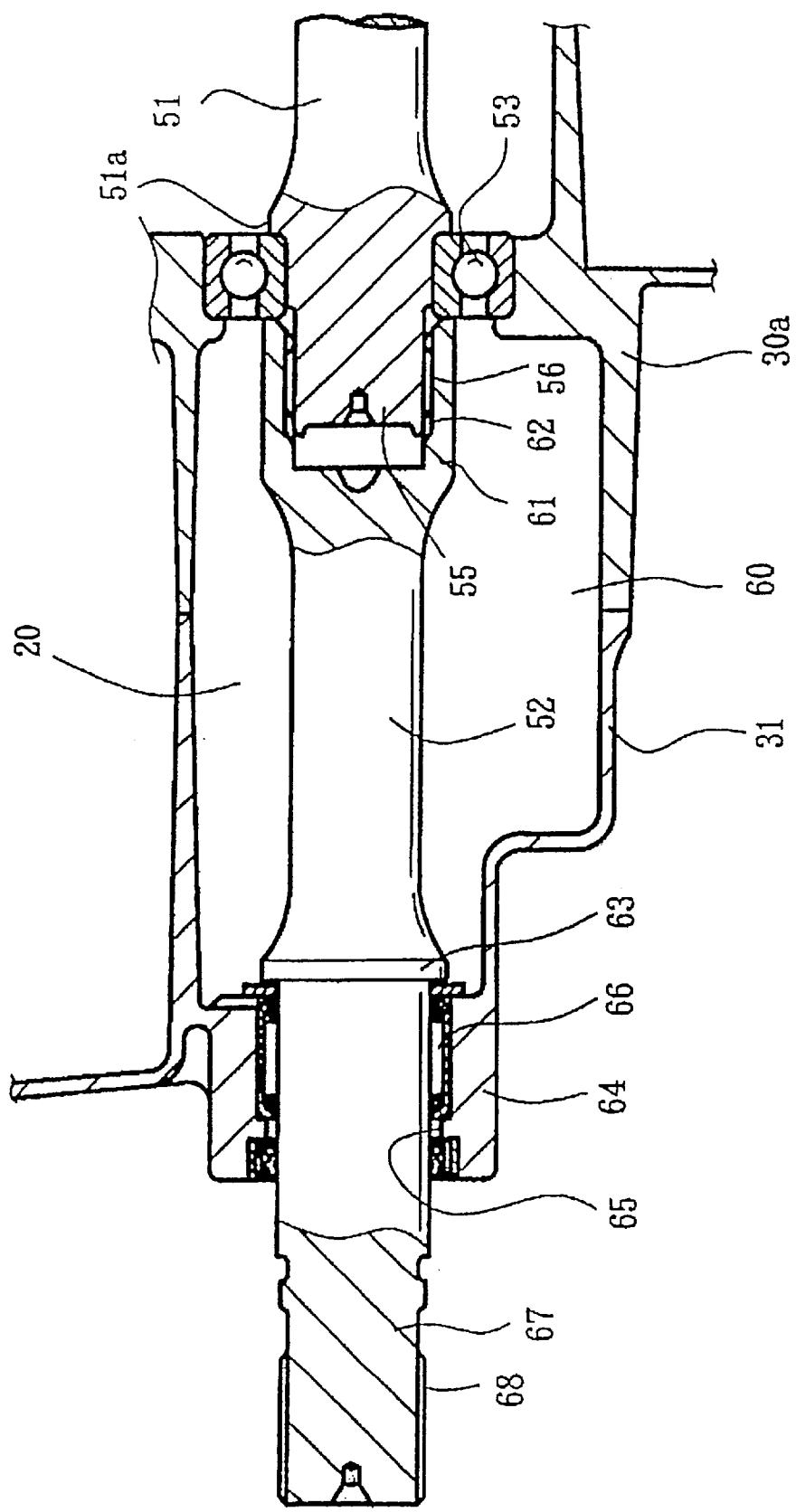
FIG. 1 is a view showing an essential portion of an embodiment applied to a four-wheel drive specification.

The structure of the output shaft 20 will be described below. FIG. 3 shows the output shaft 20 in the state adapted for a four-wheel drive specification, and FIG. 1 is a schematic sectional view of only the front portion of the output shaft 20 shown in FIG. 3. As shown in these figures, the output shaft 20 is a shaft member for transmitting an output of the engine, whose speed is changed by a transmission 44 provided in the crank case 30, to the front wheel 2 and the rear wheel 3.

The transmission 44, which is a known usually meshed type transmission, includes a main shaft 45 and a counter shaft 46 disposed in parallel to the crank shaft 5. A speed change clutch 47 is provided at one end of the main shaft 45 for intermittently transmitting a drive force transmitted from the crank shaft 5 to the main shaft 45, and a speed change gear train 48 composed of a number of gears usually meshed with each other is provided between the main shaft 45 and the counter shaft 46. The output, whose speed has been changed by the speed change gear train 48, is outputted from a final drive gear 49 provided at one end of the counter shaft 46 to a final driven gear 50 on the output shaft 20.

The output shaft 20 is divided into a main body portion 51 equivalent to a rear wheel side shaft portion, and a front wheel connection portion 52 equivalent to a front wheel side shaft portion. The main body portion 51 has two front and rear bearing portions which are rotatably supported by the crank case 30 via a ball bearing 53 and a needle bearing 54, respectively.

The front end side of the main body portion 51 in the axial direction includes a front end portion 55 passing through the bearing hole of the ball bearing 53 and projecting forwardly therefrom, and a large-diameter stopper stepped portion 51a (see FIG. 1) stepwise formed at the rear end of the front end portion 55. A male spline 56 (see FIG. 4) is formed on the outer periphery of the front end portion 55. The rear side of the main body portion 51 has a gear mounting portion 57 further projecting rearwardly from the bearing hole of the rear side needle bearing 54. The final driven gear 50 is integrally rotatably spline-connected to the outer periphery of the gear mounting portion 57.

A cylindrical outlet portion 58 projects rearwardly from the rear case cover 32, and a rear end portion 59 of the main body portion 51 passes through the outlet portion 58 and projects rearwardly therefrom. A male spline is formed on the outer periphery of the rear end portion 59, and a female spline is formed in the inner periphery of a joint on the rear wheel propeller shaft 24 side. The male spline of the rear end portion 59 is fitted in the female spline of the joint. In this way, the rear end portion 59 of the main body portion 51 is integrally rotatably spline-connected to the joint on the rear wheel propeller shaft 24 side.

A large-diameter rear end portion 61 of the front wheel connection portion 52 has, at its axial center portion, a fitting hole opened rearwardly. A female spline 62 is formed in the inner periphery of the fitting hole of the rear end portion 61. In a cylindrical housing space 60 formed at the front of the ball bearing 53, the front end portion 55 of the main body portion 51 is fitted in the fitting hole of the rear end portion 61. At this time, the male spline 56 formed on the outer periphery of the front end portion 55 is fitted in the female spline 62 formed in the inner periphery of the rear end portion 61. In this way, the front end portion 55 of the main body portion 51 is spline-connected to the rear end portion 61 of the front wheel connection portion 52.

The front wheel connection portion 52 has at its intermediate portion a large-diameter portion 63. An outlet portion 64 projects forwardly from the front surface of the rear cover 31. A portion, located forwardly from the large-diameter portion 63, of the front wheel connection portion 52 passes through a through-hole 65 of the outlet portion 64 and projects forwardly therefrom, and is supported in the through-hole 65 by a needle bearing 66. At this time, the large-diameter portion 63 functions as a stopper.

The front portion of the front wheel connection portion 52, which passes through the outlet portion 64 and projects forwardly therefrom, has a front end portion 67. A male spline 68 is formed on the outer periphery of the front end portion 67, and a female spline is formed in the inner periphery of a joint on the front wheel propeller shaft 21. The male spline 68 of the front end portion 67 is fitted in the female spline of the joint (see FIG. 3). In this way, the front wheel connection portion 52 is integrally rotatably spline-connected to the front wheel propeller shaft 21.

The function of this embodiment will be described below. In the case of applying the output shaft structure in this embodiment to the front and rear wheel (four-wheel) drive specification, the front end portion 55 of the main body portion 51 is made to pass through the bearing hole of the ball bearing 53 and project in the housing space 60; the outer periphery of the front end portion 55 is fitted in the fitting hole formed in the axial center portion of the rear end portion 61 of the front wheel connection portion 52; and the male spline 56 formed on the outer periphery of the front end portion 55 is fitted in the female spline 62 formed in the inner periphery of the rear end portion 61, whereby the front wheel connection portion 52 is integrally rotatably spline-connected to the main body portion 51, to form the output shaft 20.

The front end portion 67 of the front wheel connection portion 52 is then made to project forwardly from the outlet portion 64 of the front case cover 31, and is spline-connected to the joint of the front wheel propeller shaft 21, to accomplish a front wheel drive system. The rear end portion 59 of the main body portion 51 is spline-connected to the joint of the rear wheel propeller shaft 24, to accomplish a rear wheel drive system.

Accordingly, the output of the power unit 4 is transmitted to the front wheel 2 via the output shaft 20 composed of the main body portion 51 and the front wheel connection portion 52, the front wheel propeller shaft 21, and the front wheel gear box 22, whereby the front wheel 2 can be driven, and simultaneously the rear wheel 3 can be driven via the main body portion 51 and the rear wheel propeller shaft 24 connected thereto. In this way, the four wheels, that is, the two front wheels and the two rear wheels can be driven.

Figure 4:
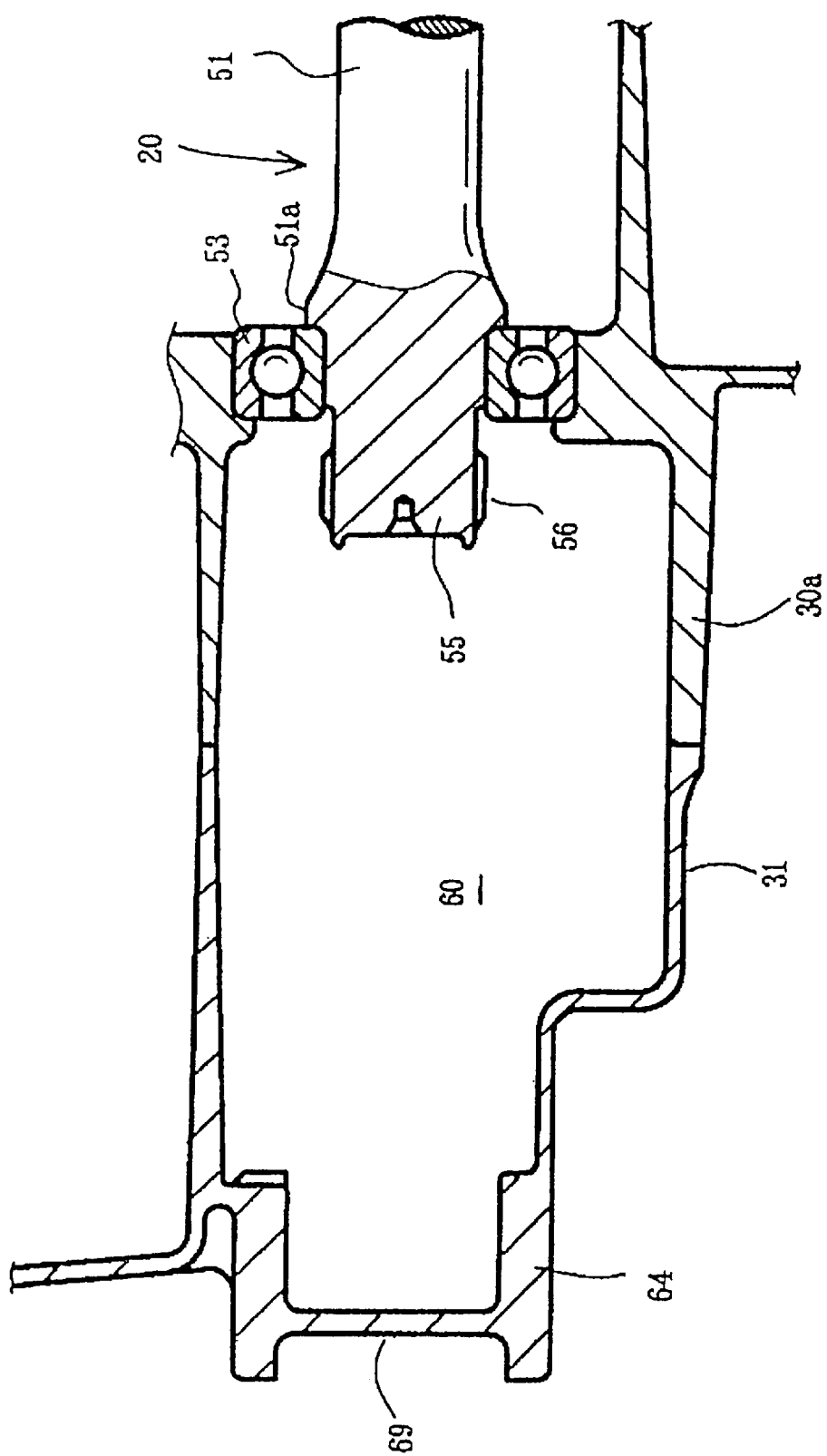
FIG. 4 is a view, similar to FIG. 1, showing the embodiment applied to a two-wheel drive specification.

In the case of applying the output shaft structure in this embodiment to the two rear wheel drive specification, the front wheel connection portion 52 is not provided and the through-hole 65 (see FIG. 1) is not provided in the outlet portion 64. To be more specific, as shown in FIG. 4, the through-hole for allowing the front wheel connection portion 52 to pass therethrough thereby rotatably supporting the front wheel connection portion 52 is not formed in the outlet portion 64. In other words, the outlet portion 64 having the through-hole 65 shown in FIG. 1 is replaced with a closed wall 69 shown in FIG. 4. The closed wall 69 is integrally formed on the front case cover 31 at the beginning stage of producing the front case cover 31, for example, by casting. The closed wall 69 is removed by post-machining in the case of applying the output shaft structure to the four-wheel drive specification; however, it may be left as it is in the case of applying the output shaft structure to the two-wheel drive specification.

In this way, by using the output shaft 20 composed of only the main body portion 51, that is, to which the front wheel connection portion 52 is not connected, the two rear wheel drive for driving only the rear wheels 3 can be realized. Accordingly, the drive type can be changed only by mounting/dismounting the front wheel connection portion 52. With respect to the power unit case, only the through-hole 65 may be formed in the outlet portion 64 for the four-wheel drive specification, and the outlet portion 64 in which the through-hole 65 is not provided may be left as the closed wall 69 for the two-wheel drive specification. As a result, the power unit case is almost sharable between the four-wheel drive specification and the two-wheel drive specification except that the power unit case is slightly subjected to post-machining for the four-wheel drive specification, to thereby simplify the change between the four-wheel drive specification and the two-wheel drive specification.

The output shaft 20, which is a longer shaft as a whole, must be rotatably supported at three points in the length direction; however, according to this embodiment, since the output shaft 20 is divided into the main body portion 51 and the front wheel connection portion 52 which are spline-connected to each other, the journal diameter at the central ball bearing 53 portion can be made small by inserting the small-diameter front end portion 55, on which the male spline is formed and which projects in the housing space upon fitting, in the bearing hole of the central ball bearing 53 thereby rotatably supporting it by the ball bearing 53, with a result that the size of the central ball bearing 53 can be reduced.

In operation, the journal diameter at the central ball bearing 53 portion is nearly equal to the journal diameter of the needle bearing 66 portion on the front end side, and is significantly smaller than the journal diameter of the needle bearing 54 portion on the rear end side. Accordingly, the central ball bearing 53 does not exert any effect on the size of the bearings at both the ends, and even if the size of the bearings at both the ends are set at required values, the central ball bearing 53 can be assembled without increasing the inside diameter of the central ball bearing 53 too much.

The output shaft 20 which is a longer shaft as a whole must be, as described above, supported at three points by the bearings; however, according to this embodiment, it is not required to make the distances larger between the output shaft 20 and the adjacent counter shaft 46 and its peripheral parts, with a result that it is possible to make the entire power unit 4 compact.

Further, the front wheel connection portion 52 can be assembled with the main body portion 51 by disposing the main body portion 51 between the front and rear cases 30a and 30b of the crank case 30 and mounting the front wheel connection portion 52 to the front end portion 55 which projects from the needle bearing 54 into the housing space 60. In this case, the front wheel connection portion 52 may be previously connected to the front end portion 55 before it is mounted to the front case cover 31, or the front wheel connection portion 52 may be previously sub-assembled with the front case cover 31 in a state in which the front end portion 67 thereof projects from the needle bearing 66 and may be mounted to the front end portion 55 when the front case cover 31 is mounted to the front surface of the front case 30a.

Accordingly, it is possible to easily assemble the front wheel connection portion 52 to the main body portion 51. Further, in the case of performing maintenance in a state in which the power unit 4 is mounted on the body frame 1, the maintenance can be sometimes sufficiently performed only by removing the front case cover 31 and the front wheel connection portion 52. In this case, since it is not required to remove the main body portion 51 and the rear case cover 32 or disassemble the crank case 30, it is possible to easily perform the maintenance work.

The output shaft 20 is a longer shaft having a plurality of bearing portions, which must be severely controlled for preventing the runout thereof and which are difficult to be kept in dimensional accuracy at the manufacturing steps and thereby must be subjected several times to straightening; however, according to this embodiment, since the longer output shaft 20 is divided into the relatively short main body portion 51 and front wheel connection portion 52, it can be manufactured by individually preparing both the portions 51 and 52 and assembling them with each other. As a result, the manufacture of the output shaft 20 requires a number of steps, such as preparation of the base material, rough-machining of the bearing portions, heat-treatment, bend flattening, polishing of the bearing portions, and re-straightening; however, according to this embodiment, the straightening after heat-treatment and polishing of the bearing portions may be omitted. Additionally, it is possible to prevent the occurrence of cracks due to straightening.

The present invention is not limited to the above-described embodiment, and it is to be understood that changes and variations may be made without departing from the scope of the present invention. For example, the present invention can be applied to a front and rear drive motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An output shaft structure for a shaft drive vehicle, comprising:

an output shaft for transmitting the output of a longitudinally mounted engine to both a front wheel side and a rear wheel side, said output shaft being connectably divided into a front wheel side shaft portion and a rear wheel side shaft portion;

a first needle bearing supporting a front end portion of the front wheel side shaft portion;

a ball bearing supporting a front end portion of the rear wheel side shaft portion; and a second needle bearing supporting a rear end portion of the rear wheel side shaft portion, wherein said front end portion of the rear wheel side shaft portion that passes forwardly of a crankcase of the engine through said ball bearing and projects into a housing space enclosing the front wheel side shaft portion, and wherein the front end portion of the rear wheel side shaft portion is fitted into a hole at a rear end of the front wheel side shaft portion.

2. The output shaft structure for a shaft drive vehicle according to claim 1, wherein said front wheel side shaft portion is spline-connected to said rear wheel side shaft portion.

3. The output structure for a shaft drive vehicle according to claim 1, wherein a stopper stepped portion is formed on a portion of said rear wheel side shaft portion that is displaced a predetermined distance relative to said front end portion.

4. The output shaft structure for a shaft drive vehicle according to claim 3, further including a male spline formed on an outer peripheral portion of said front end portion and a female spline is formed in a rear end portion of said front wheel side shaft portion for joining said rear end portion of said front wheel side shaft portion to said rear wheel side shaft portion.

5. The output shaft structure for a shaft drive vehicle according to claim 4, wherein a forward end distal from said rear end portion of said front wheel side shaft portion provides rotation to the front wheel side of the vehicle.

6. The output shaft structure for a shaft drive vehicle according to claim 4, wherein a stopper stepped portion is formed on a portion of said rear wheel side shaft portion that is displaced a predetermined distance relative to said rear end portion.

7. An output shaft for a shaft drive vehicle, comprising:

a main body including a front wheel propeller shaft and a rear wheel propeller shaft, said front wheel propeller shaft being removably mounted relative to the rear wheel propeller shaft, said front wheel propeller shaft and said rear wheel propeller shaft being joined together as a unit to form an output shaft for transmitting an output of an engine to both a front wheel side and a rear wheel side, and said front wheel propeller shaft and said rear wheel propeller shaft being separated from each other to enable transmission of said engine output only to the rear wheel side, said output shaft being connectably divided into a front wheel side shaft portion and a rear wheel side shaft portion;

a first needle bearing supporting a front end portion of the front wheel side shaft portion;

a ball bearing supporting a front end portion of the rear wheel side shaft portion; and a second needle bearing supporting a rear end portion of the rear wheel side shaft portion, wherein said front end portion of the rear wheel side shaft portion that passes through said ball bearing and projects into a cylindrical housing space enclosing the front wheel side shaft portion, said cylindrical housing space being formed by a sealed case cover and being disposed forwardly of a crankcase of the engine, and wherein the front end portion of the rear wheel side shaft portion is fitted into a hole at a rear end of the front wheel side shaft portion.

8. The output shaft structure for a shaft drive vehicle according to claim 7, wherein said front wheel propeller shaft portion is spline-connected to said rear wheel propeller shaft portion.

9. The output shaft structure for a shaft drive vehicle according to claim 7, wherein said front wheel propeller shaft does not project from said sealed case cover when said front wheel propeller shaft is disengaged from said rear wheel.

10. The output shaft structure for a shaft drive vehicle according to claim 7, wherein a stopper stepped portion is formed on a portion of said rear wheel propeller shaft that is displaced a predetermined distance relative to said front end portion.

11. The output shaft structure for a shaft drive vehicle according to claim 10, further including a male spline formed on an outer peripheral portion of said front end portion and a female spline formed in a rear end portion of said front wheel propeller shaft for joining said rear end portion of said front wheel propeller shaft to said rear wheel propeller shaft.

12. The output shaft structure for a shaft drive vehicle according to claim 11, wherein a forward end distal from said rear end portion of said front wheel propeller shaft provides rotation to the front wheel side of a vehicle.

13. The output shaft structure for a shaft drive vehicle according to claim 11, wherein a stopper stepped portion is formed on a portion of said front wheel propeller shaft that is displaced a predetermined distance relative to said rear end portion.

* * * * *